(12) United States Patent
Koch et al.

(10) Patent No.: US 11,288,727 B2
(45) Date of Patent: *Mar. 29, 2022

(54) CONTENT CREATION SUGGESTIONS USING FAILED SEARCHES AND UPLOADS

(71) Applicant: Adobe Inc., San Jose, CA (US)

(72) Inventors: Zeke Koch, San Francisco, CA (US); Baldo Antonio Faieta, San Francisco, CA (US); Jen-Chan Chien, Saratoga, CA (US); Mark M. Randall, Folsom, CA (US); Olivier Sirven, Paris (FR); Philipp Koch, Park City, UT (US); Dennis G. Nicholson, Atherton, CA (US)

(73) Assignee: Adobe Inc., San Jose, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 16/673,774

(22) Filed: Nov. 4, 2019

(65) Prior Publication Data

US 2020/0065875 A1 Feb. 27, 2020

Related U.S. Application Data

(62) Division of application No. 14/827,645, filed on Aug. 17, 2015, now Pat. No. 10,475,098.

(51) Int. Cl.
*G06F 7/00* (2006.01)
*G06Q 30/06* (2012.01)
(Continued)

(52) U.S. Cl.
CPC ......... *G06Q 30/0625* (2013.01); *G06F 16/58* (2019.01); *G06F 16/583* (2019.01);
(Continued)

(58) Field of Classification Search
CPC .... G06F 16/583; G06F 16/58; G06F 16/9535; G06F 21/16; G06F 2221/0733; G06F 2221/0775; G06Q 50/184; G06Q 30/0625
See application file for complete search history.

(56) References Cited

U.S. PATENT DOCUMENTS 5,696,964 A 12/1997 Cox et al.
6,012,073 A 1/2000 Arend et al.
(Continued)

OTHER PUBLICATIONS

"Examiner's Answer to Appeal Brief", U.S. Appl. No. 14/827,670, filed Nov. 28, 2018, 8 pages.
(Continued)

*Primary Examiner* — Azam M Cheema
(74) *Attorney, Agent, or Firm* — FIG. 1 Patents

(57) ABSTRACT

Content creation suggestion techniques are described. In one or more implementations, techniques are implemented to generate suggestions that are usable to guide creative professionals in the creation of content such as images, video, sound, multimedia, and so forth. A variety of techniques are usable to generate suggestions for the content professionals. In a first such example, suggestions are based on shared characteristics of images obtained by users of a content sharing service, e.g., licensed by the users. In another example, suggestions are generated by the content sharing service based on keywords used to locate the images. In a further example, suggestions are generated based on data described communications performed using social network services. In yet another example, recognition of failure of search is used to generate suggestions. A variety of other examples are also contemplated and described herein.

20 Claims, 13 Drawing Sheets

(51) Int. Cl.
*G06F 21/16* (2013.01)
*G06Q 50/18* (2012.01)
*G06F 16/9535* (2019.01)
*G06F 16/583* (2019.01)
*G06F 16/58* (2019.01)

(52) U.S. Cl.
CPC .......... *G06F 16/9535* (2019.01); *G06F 21/16* (2013.01); *G06Q 50/184* (2013.01); *G06F 2221/0733* (2013.01); *G06F 2221/0775* (2013.01)

(56) References Cited

U.S. PATENT DOCUMENTS

| | | | |
|---|---|---|---|
| 6,157,435 A | 12/2000 | Slater et al. |
| 6,483,570 B1 | 11/2002 | Slater |
| 6,574,616 B1 | 6/2003 | Saghir |
| 6,629,104 B1 | 9/2003 | Parulski et al. |
| 6,859,802 B1 | 2/2005 | Rui |
| 6,873,327 B1 | 3/2005 | Edwards et al. |
| 6,901,378 B1 | 5/2005 | Linker et al. |
| 6,941,294 B2 | 9/2005 | Flank |
| 7,047,413 B2 | 5/2006 | Yacobi et al. |
| 7,113,921 B2 | 9/2006 | Linker |
| 7,127,106 B1 | 10/2006 | Neil et al. |
| 7,249,034 B2 | 7/2007 | Schirmer |
| 7,286,723 B2 | 10/2007 | Taugher et al. |
| 7,460,737 B2 | 12/2008 | Shuster |
| 7,492,921 B2 | 2/2009 | Foote et al. |
| 7,493,340 B2 | 2/2009 | Rui |
| 7,523,102 B2 | 4/2009 | Bjarnestam et al. |
| 7,574,378 B2 | 8/2009 | Lipowitz et al. |
| 7,613,686 B2 | 11/2009 | Rui |
| 7,689,620 B2 | 3/2010 | Tan |
| 7,725,398 B2 | 5/2010 | Dawson et al. |
| 7,783,624 B2 | 8/2010 | Martinez et al. |
| 7,797,377 B2 | 9/2010 | Linker et al. |
| 7,808,555 B2 | 10/2010 | Aratani et al. |
| 7,818,261 B2 | 10/2010 | Weiskopf et al. |
| 7,920,760 B2 | 4/2011 | Yoda |
| 7,929,810 B2 | 4/2011 | Shuster |
| 7,933,765 B2 | 4/2011 | Summerlin et al. |
| 7,940,959 B2 | 5/2011 | Rubenstein |
| 7,949,625 B2 | 5/2011 | Brough et al. |
| 7,961,938 B1 | 6/2011 | Remedios |
| 7,996,266 B2 | 8/2011 | Gura |
| 8,041,612 B1 | 10/2011 | Treyz |
| 8,073,828 B2 | 12/2011 | Bowden et al. |
| 8,144,995 B2 | 3/2012 | Thompson |
| 8,155,382 B2 | 4/2012 | Rubenstein |
| 8,219,494 B1 | 7/2012 | Pride et al. |
| 8,229,800 B2 | 7/2012 | Trotman et al. |
| 8,285,082 B2 | 10/2012 | Heck |
| 8,285,084 B2 | 10/2012 | Yoda |
| 8,341,195 B1 | 12/2012 | Cole et al. |
| 8,380,005 B1 | 2/2013 | Jonsson |
| 8,396,331 B2 | 3/2013 | Jia et al. |
| 8,412,568 B2 | 4/2013 | Bastos et al. |
| 8,413,182 B2 | 4/2013 | Bill |
| 8,417,000 B1 | 4/2013 | Mendis |
| 8,452,049 B2 | 5/2013 | Rubenstein |
| 8,504,547 B1 | 8/2013 | Yee et al. |
| 8,515,139 B1 | 8/2013 | Nechyba et al. |
| 8,560,455 B1 | 10/2013 | Raman et al. |
| 8,571,329 B2 | 10/2013 | Thompson |
| 8,582,872 B1 | 11/2013 | Loffe et al. |
| 8,620,905 B2 | 12/2013 | Ellsworth |
| 8,625,887 B2 | 1/2014 | Li |
| 8,644,646 B2 | 2/2014 | Heck |
| 8,688,586 B2 | 4/2014 | Pride et al. |
| 8,699,826 B2 | 4/2014 | Remedios |
| 8,745,086 B2 | 6/2014 | Cardno et al. |
| 8,774,529 B2 | 7/2014 | Rubenstein et al. |
| 8,792,685 B2 | 7/2014 | Sangster |
| 8,812,392 B2 | 8/2014 | Shahghasemi |
| 8,831,998 B1 | 9/2014 | Cramer et al. |
| 8,879,837 B2 | 11/2014 | Usher |
| 8,898,171 B2 | 11/2014 | Tan |
| 8,934,717 B2 | 1/2015 | Newell et al. |
| 8,959,003 B2 | 2/2015 | Brugler et al. |
| 9,071,662 B2 * | 6/2015 | Svendsen ............... H04H 20/82 |
| 9,255,807 B2 | 2/2016 | Lee et al. |
| 9,489,400 B1 | 11/2016 | Haitani |
| 9,571,726 B2 | 2/2017 | Horowitz |
| 9,576,046 B2 | 2/2017 | Bullotta et al. |
| 9,639,634 B1 | 5/2017 | Greene et al. |
| 9,715,714 B2 | 7/2017 | Koch et al. |
| 9,824,463 B2 | 11/2017 | Ingrassia et al. |
| 9,858,244 B1 | 1/2018 | Bjorkegren |
| 9,911,172 B2 | 3/2018 | Koch et al. |
| 10,234,290 B2 | 3/2019 | Lush et al. |
| 10,366,433 B2 | 7/2019 | Koch et al. |
| 10,453,226 B1 | 10/2019 | Burrows et al. |
| 10,475,098 B2 * | 11/2019 | Koch ................. G06Q 30/0625 |
| 10,592,548 B2 | 3/2020 | Koch et al. |
| 10,853,983 B2 | 12/2020 | Tailang |
| 10,878,021 B2 | 12/2020 | Koch et al. |
| 2002/0033844 A1 | 3/2002 | Levy et al. |
| 2003/0151611 A1 | 8/2003 | Turpin et al. |
| 2004/0202349 A1 | 10/2004 | Erol et al. |
| 2005/0010553 A1 | 1/2005 | Liu |
| 2006/0184572 A1 | 8/2006 | Meek et al. |
| 2006/0204142 A1 | 9/2006 | West et al. |
| 2006/0218651 A1 | 9/2006 | Ginter et al. |
| 2007/0097959 A1 | 5/2007 | Taylor |
| 2007/0133947 A1 | 6/2007 | Armitage et al. |
| 2007/0168513 A1 | 7/2007 | Weiskopf et al. |
| 2007/0208670 A1 | 9/2007 | Quoc |
| 2007/0276759 A1 | 11/2007 | Ginter et al. |
| 2007/0297683 A1 | 12/2007 | Luo et al. |
| 2008/0144883 A1 | 6/2008 | Kacker et al. |
| 2008/0152146 A1 | 6/2008 | Conrado et al. |
| 2009/0083236 A1 | 3/2009 | Shuster |
| 2009/0160859 A1 | 6/2009 | Horowitz |
| 2009/0276453 A1 | 11/2009 | Trout et al. |
| 2009/0287669 A1 | 11/2009 | Bennett |
| 2010/0070342 A1 | 3/2010 | Hu et al. |
| 2010/0268737 A1 * | 10/2010 | Podilchuk ............ G06K 9/3241 |
| | | | 707/780 |
| 2010/0306344 A1 | 12/2010 | Athas et al. |
| 2011/0029408 A1 | 2/2011 | Shusterman et al. |
| 2011/0167059 A1 | 7/2011 | Fallah |
| 2011/0270697 A1 | 11/2011 | Sunkada |
| 2012/0094639 A1 | 4/2012 | Carlson et al. |
| 2012/0120097 A1 | 5/2012 | Sun et al. |
| 2012/0128239 A1 | 5/2012 | Goswami et al. |
| 2012/0179673 A1 | 7/2012 | Kelly et al. |
| 2012/0226651 A1 | 9/2012 | Chidlovskii |
| 2013/0019257 A1 | 1/2013 | Tschernutter et al. |
| 2013/0024293 A1 | 1/2013 | Tinsman et al. |
| 2013/0080881 A1 | 3/2013 | Goodspeed et al. |
| 2013/0117258 A1 | 5/2013 | Linsley et al. |
| 2013/0132886 A1 | 5/2013 | Mangini |
| 2013/0167105 A1 | 6/2013 | Goldman et al. |
| 2013/0215116 A1 | 8/2013 | Siddique et al. |
| 2013/0335582 A1 | 12/2013 | Itasaki et al. |
| 2014/0019264 A1 | 1/2014 | Wachman et al. |
| 2014/0046792 A1 | 2/2014 | Ganesan |
| 2014/0059139 A1 | 2/2014 | Filev et al. |
| 2014/0114962 A1 | 4/2014 | Rosenburg et al. |
| 2014/0122283 A1 | 5/2014 | Mehra et al. |
| 2014/0149376 A1 | 5/2014 | Kutargi et al. |
| 2014/0189525 A1 | 7/2014 | Trevisiol et al. |
| 2014/0201227 A1 | 7/2014 | Hamilton-Dick et al. |
| 2014/0245358 A1 | 8/2014 | Kumar et al. |
| 2014/0289134 A1 | 9/2014 | Sutton |
| 2014/0310264 A1 | 10/2014 | D'Ambrosio |
| 2014/0324838 A1 | 10/2014 | Sako et al. |
| 2014/0351021 A1 | 11/2014 | Higbie |
| 2014/0351284 A1 | 11/2014 | Ikonomov |
| 2014/0365463 A1 | 12/2014 | Tusk |
| 2015/0018094 A1 | 1/2015 | Watari et al. |
| 2015/0058998 A1 | 2/2015 | Yu et al. |
| 2015/0106628 A1 | 4/2015 | Holman et al. |

(56) References Cited

U.S. PATENT DOCUMENTS

| | | |
|---|---|---|
| 2015/0161258 A1 | 6/2015 | Yee et al. |
| 2015/0234864 A1 | 8/2015 | Kruckemeier |
| 2015/0278211 A1 | 10/2015 | Voronel |
| 2015/0324394 A1 | 11/2015 | Becker et al. |
| 2015/0347369 A1 | 12/2015 | Babon et al. |
| 2015/0363503 A1 | 12/2015 | Scheuerman |
| 2016/0035055 A1 | 2/2016 | Perkins et al. |
| 2016/0048985 A1 | 2/2016 | Jones |
| 2016/0180193 A1 | 6/2016 | Masters |
| 2016/0196589 A1 | 6/2016 | Subbarayan |
| 2016/0226984 A1* | 8/2016 | Kelly ............ H04L 67/22 |
| 2016/0239680 A1 | 8/2016 | Holz |
| 2016/0253707 A1 | 9/2016 | Momin et al. |
| 2016/0314203 A1 | 10/2016 | Wickenkamp |
| 2016/0350379 A1* | 12/2016 | Bank ............ G06F 16/285 |
| 2016/0370973 A1 | 12/2016 | Morgan et al. |
| 2017/0023607 A1 | 1/2017 | Bedrossian |
| 2017/0034286 A1 | 2/2017 | Krischner |
| 2017/0052981 A1 | 2/2017 | Koch et al. |
| 2017/0053103 A1 | 2/2017 | Koch et al. |
| 2017/0053104 A1 | 2/2017 | Koch et al. |
| 2017/0053189 A1 | 2/2017 | Koch et al. |
| 2017/0053332 A1 | 2/2017 | Koch et al. |
| 2017/0053365 A1 | 2/2017 | Koch et al. |
| 2017/0053372 A1 | 2/2017 | Koch et al. |
| 2017/0221171 A1 | 8/2017 | Koch et al. |
| 2017/0300750 A1 | 10/2017 | Jonsson et al. |
| 2019/0065856 A1 | 2/2019 | Harris et al. |
| 2020/0097764 A1 | 3/2020 | de Juan |
| 2020/0334878 A1 | 10/2020 | Tailang |

OTHER PUBLICATIONS

"Final Office Action", U.S. Appl. No. 14/827,583, filed Mar. 8, 2019, 25 pages.
"Final Office Action", U.S. Appl. No. 14/827,600, filed Apr. 25, 2019, 10 pages.
"Final Office Action", U.S. Appl. No. 14/827,645, filed Mar. 13, 2019, 12 pages.
"Final Office Action", U.S. Appl. No. 14/827,670, filed Feb. 1, 2018, 29 pages.
"Final Office Action", U.S. Appl. No. 14/827,836, filed Jul. 14, 2017, 24 pages.
"Final Office Action", U.S. Appl. No. 14/827,836, filed Oct. 30, 2018, 14 pages.
"Final Office Action", U.S. Appl. No. 14/828,085, filed Jul. 20, 2018, 28 pages.
"Final Office Action", U.S. Appl. No. 14/828,085, filed Dec. 12, 2017, 29 pages.
"First Action Interview Office Action", U.S. Appl. No. 14/827,600, filed Sep. 24, 2018, 3 pages.
"First Action Interview Office Action", U.S. Appl. No. 14/827,836, filed Mar. 22, 2017, 4 pages.
"First Action Interview Office Action", U.S. Appl. No. 14/827,670, filed Aug. 29, 2017, 4 pages.
"First Action Interview Office Action", U.S. Appl. No. 14/828,085, filed Aug. 24, 2017, 4 pages.
"Non-Final Office Action", U.S. Appl. No. 14/827,583, filed Jul. 29, 2019, 26 pages.
"Non-Final Office Action", U.S. Appl. No. 14/827,600, filed Apr. 22, 2019, 11 pages.
"Non-Final Office Action", U.S. Appl. No. 14/827,600, filed Sep. 4, 2019, 10 pages.
"Non-Final Office Action", U.S. Appl. No. 14/827,645, filed Oct. 29, 2018, 12 pages.
"Non-Final Office Action", U.S. Appl. No. 14/827,836, filed Apr. 4, 2018, 26 pages.
"Non-Final Office Action", U.S. Appl. No. 14/828,085, filed Mar. 26, 2018, 29 pages.
"Non-Final Office Action", U.S. Appl. No. 14/828,085, filed Jun. 12, 2019, 25 pages.
"Notice of Allowance", U.S. Appl. No. 14/827,645, filed Jun. 26, 2019, 12 pages.
"Notice of Allowance", U.S. Appl. No. 14/827,836, filed Mar. 13, 2019, 10 pages.
"Notice of Allowance", U.S. Appl. No. 14/827,974, filed Apr. 19, 2017, 7 pages.
"Notice of Allowance", U.S. Appl. No. 15/491,943, filed Oct. 24, 2017, 6 pages.
"Pre-Interview Communication", U.S. Appl. No. 14/827,670, filed Feb. 17, 2017, 3 pages.
"Pre-Interview Communication", U.S. Appl. No. 14/827,836, filed Jan. 26, 2017, 4 pages.
"Pre-Interview Communication", U.S. Appl. No. 14/827,974, filed Mar. 1, 2017, 3 pages.
"Pre-Interview Communication", U.S. Appl. No. 14/828,085, filed Feb. 28, 2017, 4 pages.
"Pre-Interview Communication", U.S. Appl. No. 15/491,943, filed Sep. 14, 2017, 3 pages.
"Pre-Interview First Office Action", U.S. Appl. No. 14/827,583, filed Oct. 5, 2018, 5 pages.
"Pre-Interview First Office Action", U.S. Appl. No. 14/827,600, filed Aug. 10, 2018, 3 pages.
"Pre-Interview First Office Action", U.S. Appl. No. 14/827,645, filed Nov. 5, 2018, 3 pages.
"Restriction Requirement", U.S. Appl. No. 14/827,583, filed Jul. 19, 2019, 6 pages.
"Restriction Requirement", U.S. Appl. No. 14/827,645, filed Jun. 18, 2018, 6 pages.
"Supplemental Notice of Allowance", U.S. Appl. No. 14/827,836, filed Jun. 21, 2019, 2 pages.
"Supplemental Notice of Allowance", U.S. Appl. No. 15/491,943, filed Feb. 6, 2018, 2 pages.
Trevisiol,"Image Ranking Based on User Browsing Behavior", SIGIR '12 Proceedings of the 35th international ACM SIGIR conference on Research and development in information retrieval, ACM ISBN: 978-1-4503-1472-5, Aug. 16, 2012, 10 pages.
"Corrected Notice of Allowability", U.S. Appl. No. 14/827,600, filed Oct. 23, 2020, 2 pages.
"Corrected Notice of Allowability", U.S. Appl. No. 14/827,600, filed Nov. 19, 2020, 2 pages.
"Examiner's Answer to Appeal Brief", U.S. Appl. No. 14/827,583, filed Oct. 16, 2020, 37 pages.
"Non-Final Office Action", U.S. Appl. No. 14/827,670, filed Sep. 29, 2020, 13 pages.
"Supplemental Notice of Allowability", U.S. Appl. No. 16/390,876, filed Oct. 28, 2020, 2 pages.
"Final Office Action", U.S. Appl. No. 14/827,583, filed Mar. 18, 2020, 28 pages.
"First Action Interview Office Action", U.S. Appl. No. 16/390,876, filed May 18, 2020, 5 pages.
"Pre-Interview First Office Action", U.S. Appl. No. 16/390,876, filed Apr. 2, 2020, 5 pages.
Fisher,"Characterizing Structural Relationships in Scenes Using Graph Kernels", Jul. 2011, 11 pages.
Fisher,"Context-Based Search for 3D Models", Dec. 2010, 10 pages.
Lee,"Context-Aware Synthesis and Placement of Object Instances", Dec. 7, 2018, 11 pages.
Ma,"Action-Driven 3D Indoor Scene Evolution", Nov. 2016, 13 pages.
Ma,"Analysis and Modeling of 3D Indoor Scene", Jun. 29, 2017, 34 pages.
Savva,"SceneSuggest: Context-driven 3D Scene Design", Feb. 28, 2017, 10 pages.
Wang,"Deep Convolutional Priors for Indoor Scene Synthesis", May 2018, 14 pages.
Yu,"The Clutterpalette: An Interactive Tool for Detailing Indoor Scenes", Mar. 2015, 11 pages.
Zhang,"What and Where: A Context-based Recommendation System for Object Insertion", Nov. 24, 2018, 12 pages.
"Final Office Action", U.S. Appl. No. 14/827,670, filed Jan. 25, 2021, 11 pages.

(56) References Cited

OTHER PUBLICATIONS

"Notice of Allowance", U.S. Appl. No. 14/827,670, filed Mar. 30, 2021, 10 pages.
"Corrected Notice of Allowability", U.S. Appl. No. 14/828,085, filed Jan. 2, 2020, 3 pages.
"Final Office Action", U.S. Appl. No. 14/827,600, filed Jan. 24, 2020, 13 pages.
"Notice of Allowance", U.S. Appl. No. 14/828,085, filed Nov. 14, 2019, 11 pages.
"Advisory Action", U.S. Appl. No. 14/827,583, filed Sep. 15, 2020, 3 pages.
"Notice of Allowance", U.S. Appl. No. 16/390,876, filed Jul. 13, 2020, 5 pages.
"Notice of Allowance", U.S. Appl. No. 14/827,600, filed Aug. 19, 2020, 8 pages.
"Patent Trial and Appeal Board Decision", U.S. Appl. No. 14/827,670, filed Jul. 2, 2020, 16 pages.
"Patent Trial and Appeal Board Decision", U.S. Appl. No. 14/827,583, filed Sep. 29, 2021, 26 pages.

\* cited by examiner

CONTENT CREATION SUGGESTIONS USING FAILED SEARCHES AND UPLOADS

RELATED APPLICATION

This application is a divisional of and claims priority to U.S. patent application Ser. No. 14/827,645, filed Aug. 17, 2015, the entire disclosure of which is hereby incorporated by reference herein in its entirety.

BACKGROUND

Content sharing services have been developed as a technique to provide an online marketplace for creative professionals to sell content, such as images. A creative professional, for instance, may capture or create images that are exposed via the content sharing services to potential customers such as marketing professionals, casual users, and so on. For example, a creative professional may capture an image of a coworkers conversing next to a watercooler. The image is then uploaded and tagged for availability as part of the content sharing service such that a marketing professional performing a search for "office" and "watercooler" may locate the image. The content sharing service also includes functionality to make the image available for licensing in response to payment of a fee, e.g., as part of a subscription service, pay per use, and so forth.

In conventional digital online marketplaces, however, a particular image desired by a marketing professional may not be available. Therefore, in order to obtain the image the marketing professional is then forced to commission a creative professional to create the image or settle for a similar image, which may take time and is expensive and thus could force the marketing professional to miss or delay in addressing an opportunity for a marketing campaign. Similarly, in conventional services creative professionals are not made aware of which images are desired by users of the content sharing service absent such commissions and as such are forced to guess which image are likely to be purchased by the users. This results in a divide between the creative professionals that create the images and the consumers of the images, which is both inefficient and frustrating to both entities.

SUMMARY

Content creation suggestion techniques are described. In one or more implementations, techniques are implemented to generate suggestions that are usable to guide creative professionals in the creation of content such as images, video, sound, multimedia, and so forth. A variety of techniques are usable to generate suggestions for the content professionals. In a first such example, suggestions are based on shared characteristics of images obtained by users of a content sharing service, e.g., licensed by the users. In another example, suggestions are generated by the content sharing service based on keywords used to locate the images. In a further example, suggestions are generated based on data described communications performed using social network services. In yet another example, recognition of search failure is used to generate suggestions. A variety of other examples are also contemplated and described in the following.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
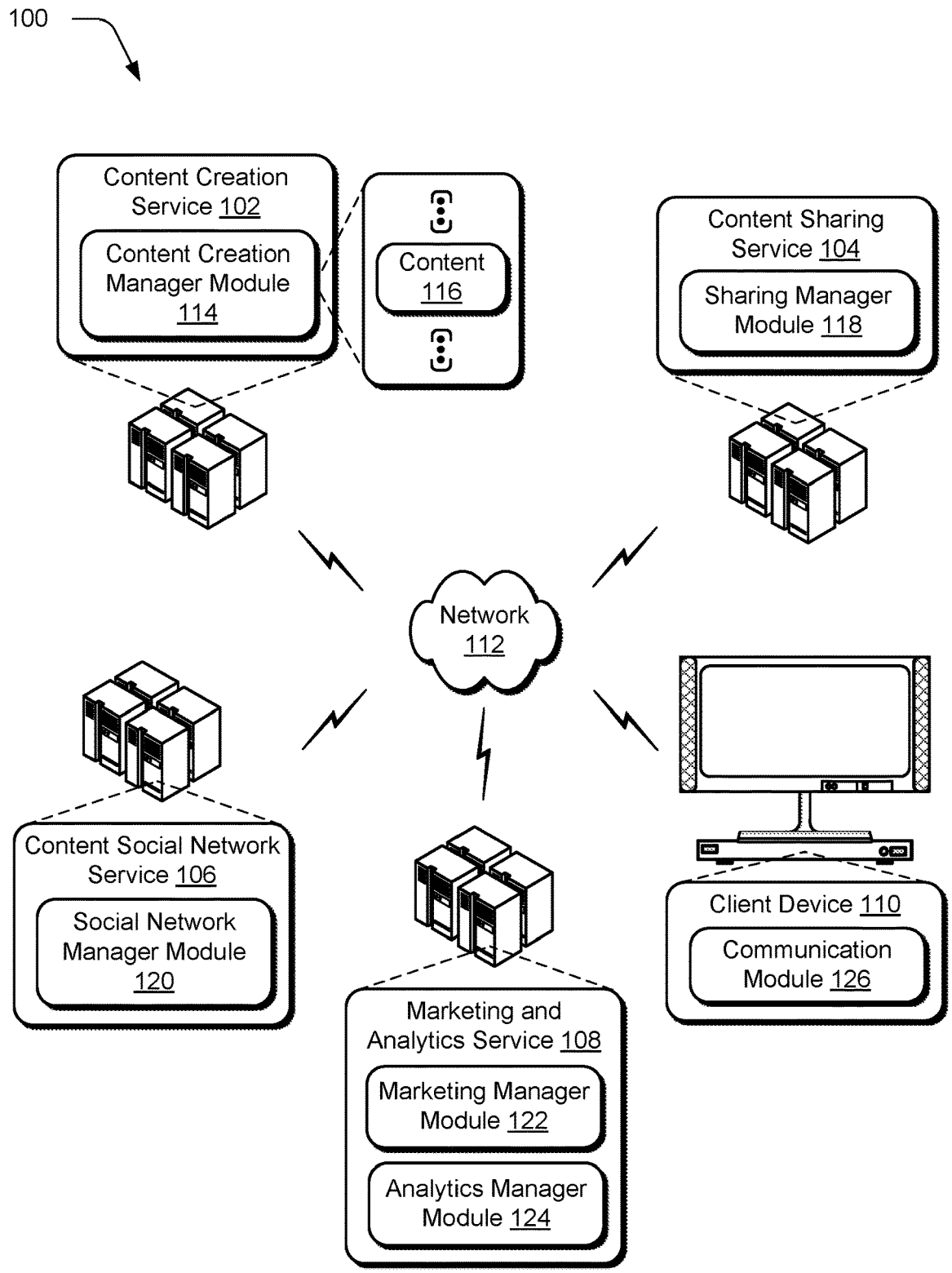
FIG. 1 is an illustration of an environment in an example implementation that is operable to employ content creation and deployment techniques described herein.

Content sharing services provided via a digital environment are configured to unite content from creative professionals with consumers of the content, such as marketers. An example of this is the content sharing service is Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two.

While serving as a valuable technique in which creative professional may be united with potential consumers, conventional content sharing services of the digital environment do not support techniques to fill unmet needs of consumers nor inform creative professionals of these needs. As a result, this results in a divide in the digital environment between consumers and creators which is inefficient, results in "best guess" scenarios for creative professionals, and requires potential consumers to "make do" with what is currently available via the service.

Accordingly, a digital environment is described in the following that supports content creation suggestion techniques and systems. In the following, these techniques and systems are implemented to generate suggestions that are usable to guide creative professionals in the creation of content such as images, video, sound, multimedia, and so forth and thus the users are not forced to engage in the "best guess" scenarios of conventional digital environments. Thus, this may be used to improve efficiency, accuracy, and bridge the divide between content creation professionals and consumers as described above.

A variety of techniques are usable to generate suggestions for the content professionals in the following digital environment. In a first such example, suggestions are based on shared characteristics of images obtained by users of a content sharing service, e.g., licensed by the users. The content sharing service, for instance, may determine which images are actually obtained (e.g., via licensing) by users and characteristics of those images. These characteristics are then exposed as suggestions to guide creation of subsequent content, further discussion of which is described in relation to FIGS. 2 and 3.

In another example, suggestions are generated by the content sharing service based on keywords used to locate the images. The service, for instance, may monitor trends of keywords used to search for images, such as "dragon" and "winter" exhibiting an upward trend following increasing popularity of a television series. These keywords are then exposed as suggestions to the creative professionals and thus may also be used to guide creation of subsequent content, further discussion of which is included in relation to FIGS. 4 and 5.

In a further example, suggestions are generated based on data described communications performed using social network services. An analytical service "over the cloud", for instance, may detect trends as described above, which may include keywords and images involved in communications via the service, e.g., as posts, status updates, and so on. Characteristics of images involved in the trends are analyzed to determine likely desires of consumers, e.g., for a medieval look-and-feel to images as following the previous example of a television series. These characteristics are then exposed to guide creation of subsequent content, further discussion of which is described in relation to FIGS. 6 and 7.

In yet another example, recognition of failure of search is used to generate suggestions. The content sharing service, for instance, may determine that a threshold number of searches have been performed that have resulted in less than a threshold number of results. This determination is recognized that these searches have failed and this information is exposed as suggestions to content professionals to guide creation of subsequent content. In this way, the unmet demand may be exposed to and met by creative professionals in an efficient manner, further discussion of which is described in relation to FIGS. 8 and 9. Additionally, recognition of a failed search may be used by the content sharing service to supplement the search based on trends exhibited by other searches, thereby increasing a likelihood that a consumer is provided with content of interest, further discussion of which is described in relation to FIG. 10.

The content sharing service, as described above, may serve to unite creative professionals with consumers via an online marketplace. As part of this, the content sharing service is configured to support a variety of functionality, such as pricing, tagging, digital rights management, and so forth. For example, the content sharing service may be configured to tag an image using keywords such that the image is locatable via a search, may embed digital rights functionality to protect the image from unauthorized use, and so forth. In this way, functionality of the content sharing service that is made available to users may be further expanded, discussion of which is included in relation to FIGS. 11 and 12.

In the following discussion, an example environment is first described that is configured to employ the image creation suggestion techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. A digital medium environment is illustrated that is configured to generate and control suggestions usable to guide content creation. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 13.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Fotolia® by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content creation suggestions, further discussion of which begins in relation to FIG. 2 in the following.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth. A variety of other arrangements of functionality represented by the entities of the environment 100 of FIG. 1 are also contemplated without departing from the spirit and scope thereof. Having now described an environment that is usable to implement the techniques described herein, examples of the content creation suggestion techniques are described in the following.

Figure 2:
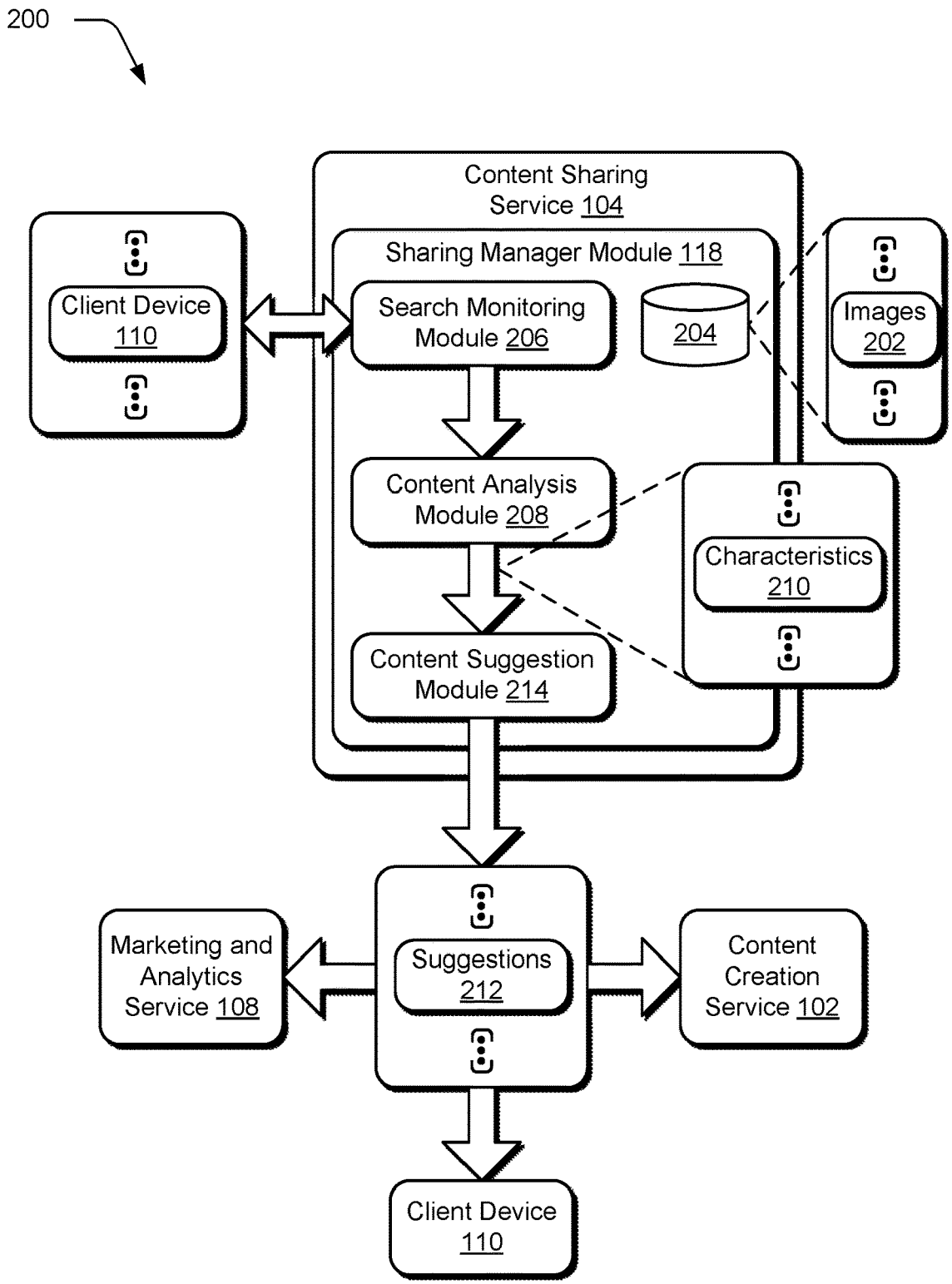
FIG. 2 depicts a system and FIG. 3 is a flow diagram depicting a procedure in an example implementation in which suggestions are based on shared characteristics of images obtained by users of a content sharing service.
Figure 3:
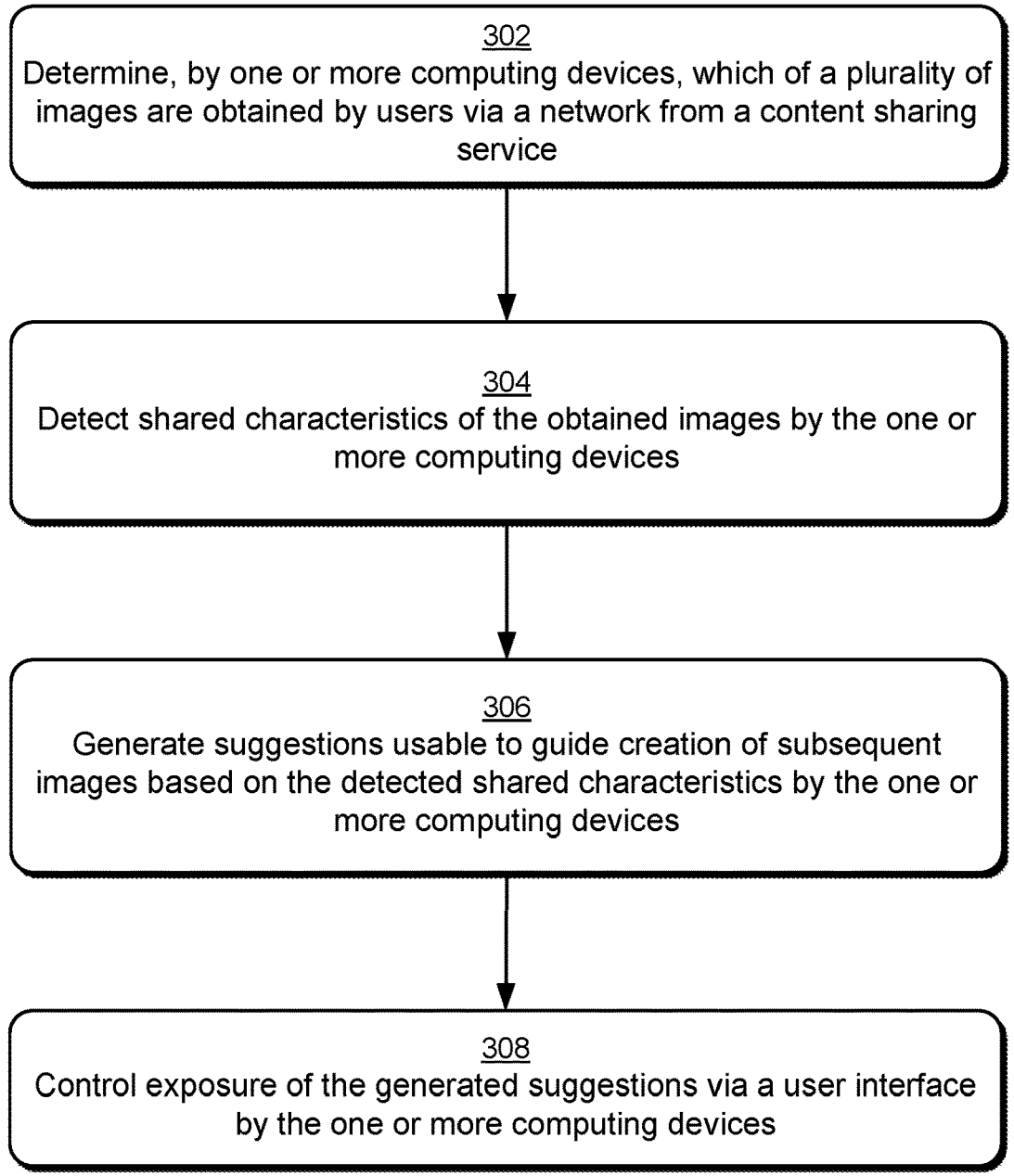

FIG. 2 depicts a system 200 and FIG. 3 depicts a procedure 300 in an example implementation in which suggestions are based on shared characteristics of images obtained by users of a content sharing service 104. The content sharing service, for instance, may determine which images are actually obtained (e.g., licensed) by users and characteristics of those images. These characteristics are then exposed as suggestions to guide creation of subsequent content. In the following, reference is made interchangeably to both FIGS. 2 and 3.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Suggestions may be used to bridge a gap between characteristics of content to be created by a content professional and the characteristics of content desired by consumers of the content, e.g., a marketing professional. In this example, the suggestions are based on shared characteristics of images obtained by users of a content sharing service, e.g., licensed by the users for use as part of a marketing campaign.

To start, a determination is made by one or more computing devices as to which of a plurality of images are obtained by users via a network from a content sharing service (block 302), such as licensed as part of a subscription, pay-per-use, and so on. As illustrated in FIG. 2, for instance, a sharing manager module 118 includes images 202 stored in storage 204. A search monitoring module 206 is used to perform searches to locate images 202 desired by users of client devices 110, such as marketing professionals as part of a marketing campaign, casual or business users for limited used (e.g., as part of a slide deck), and so on. The searches may be performed in a variety of ways, such as to match keywords included in a search query with tags associated with the images 202, use of an exemplar to find similar images, and so forth.

Characteristics that are shared by the obtained images are then detected (block 304). A content analysis module 208, for instance, may detect characteristics included in the images 202 and then determine which characteristics, if any, are shared by the images, e.g., over a threshold amount. A variety of characteristics may be shared by the images 202. For example, the shared characteristics may involve how or where the obtained images are generated. This may include whether the images are captured by an image capture device, a particular brand of image capture device, settings used in the capturing of the images, and so on.

This may also include whether the images are created "from scratch" virtually or processed by a creative professional, tools used in the creation, image filters and effects applied to the image, and so on. The images 202, for instance, may be processed by the content creation service 102 to alter pixels included in the images 202. The content analysis module 208 may then determine how those pixels were altered, e.g., which filters were applied, through analysis of the image itself, metadata associated with the image, and so on. A variety of other examples are also contemplated, such as to perform object identification to identify animate (e.g. particular human faces) or inanimate objects.

Suggestions 212 are generated to guide creation of subsequent images based on the detected shared characteristics (block 306). A content suggestion module 214, for instance, may receive the characteristics 210 identified by the content analysis module 208 and generate the suggestions 212 based on these characteristics 210. Continuing with the previous examples, the content suggestion module 214 may determine characteristics 210 such as common objects included in the images 202 and output suggestions 212 identifying those objects. The content suggestion module 214 may also determine common characteristics 210 such as devices (e.g., particular cameras or lens) or processing performed on the images (e.g., image filters, tools, and effects) and identify these devices or effects as suggestions 212. In this way, the suggestions 212 may describe characteristics of "what is popular" that are usable to guide a creative professional in creation of images 202 that have an increased likelihood of being popular.

Exposure of the generated suggestions is controlled via a user interface by the one or more computing devices (block 308). The suggestions 212, for instance, may be output to a marketing and analytics service 108 to guide creation of content for a marketing campaign. The suggestions 212 may also be communicated to a content creation service 102 for output as part of a content creation process. A creative professional, for instance, may provide one or more inputs describing content to be created (e.g., outdoor landscape of waterfall) and be provided with suggestions 212 for such a scene. The suggestions 212 may also be output to one of the client devices 110 that originated a search, e.g., to suggest similar characteristics for content to be created based on what images 202 are being searched for a user. In this way, the suggestions 212 are usable to guide a creative professional in a variety of ways and thus bridge a gap between creative professionals and consumers of content from the creative professionals.

Figure 4:
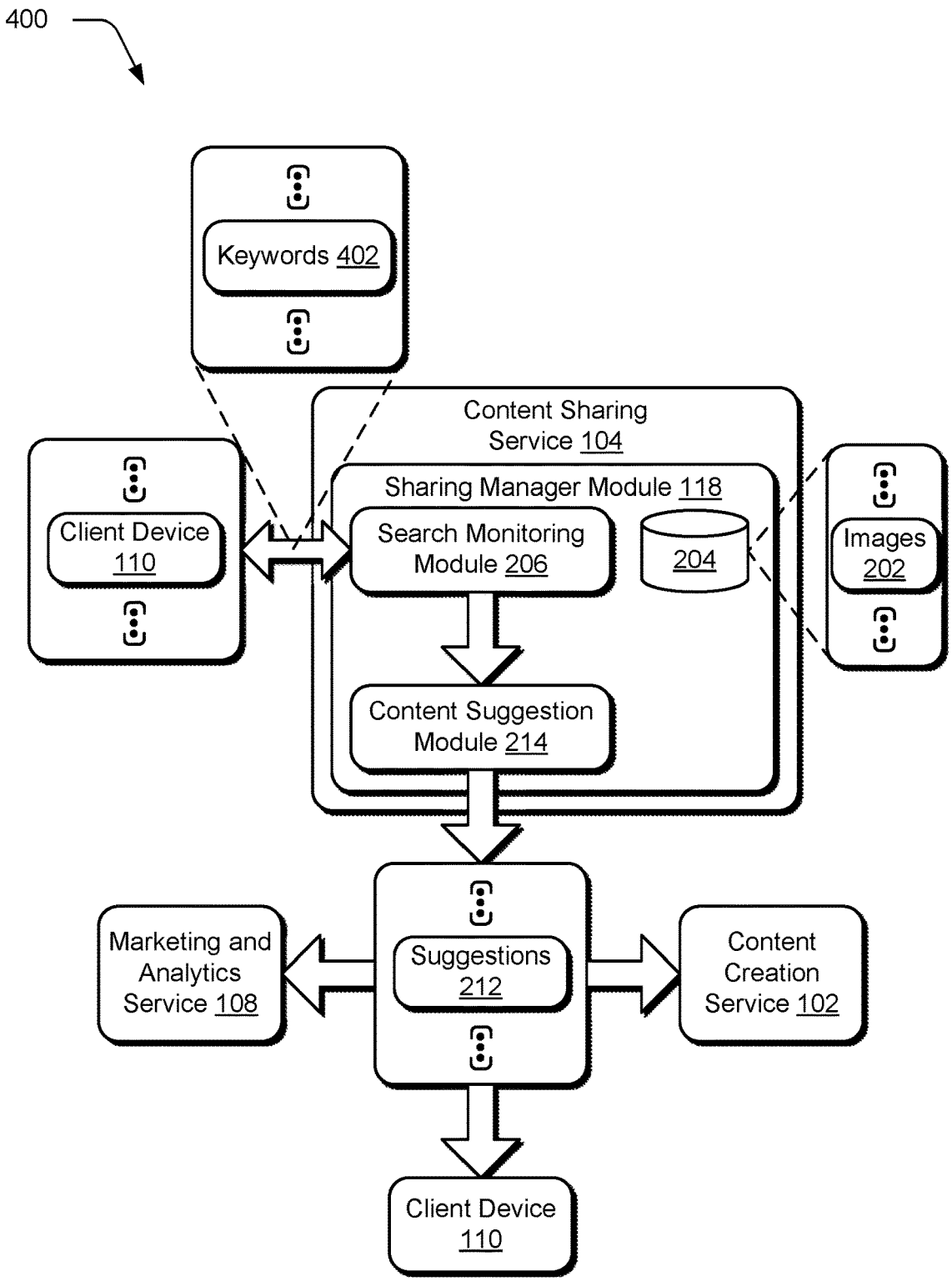
FIG. 4 depicts a system and FIG. 5 depicts a procedure in an example implementation in which suggestions are based on keywords used to search for images available via a content sharing service.
Figure 5:
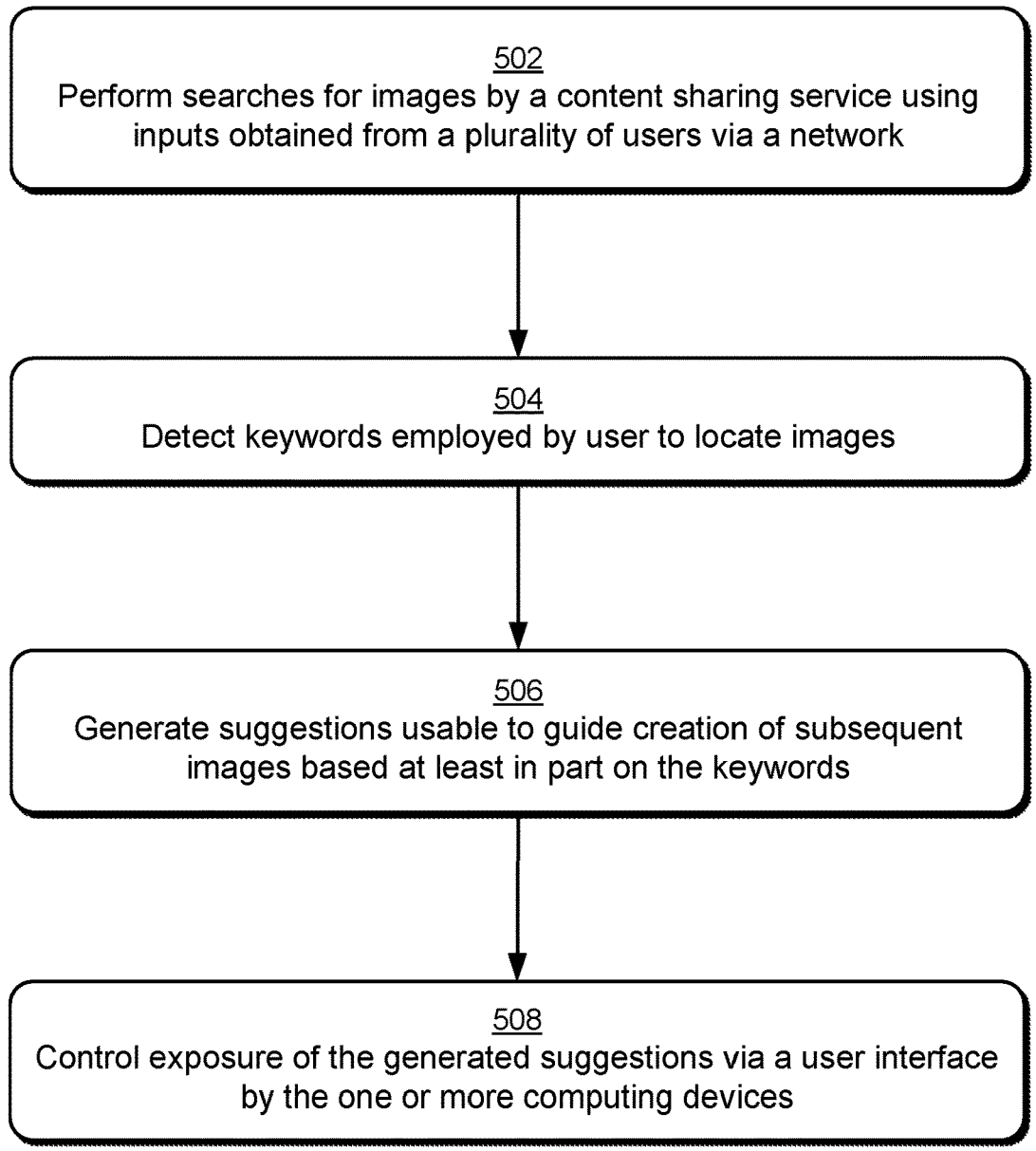

FIG. 4 depicts a system 400 and FIG. 5 depicts a procedure 500 in an example implementation in which suggestions are based on keywords used to search for images available via a content sharing service 104. The content sharing service, for instance, may determine which keywords are used to search for images and select keywords based on popularity, trends, and so on to guide users in creation of subsequent images. In the following, reference is made interchangeably to both FIGS. 4 and 5.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Like FIG. 2, the sharing manager module 118 includes a search monitoring module 206 that is configured to monitor searches performed by the content sharing service 104 to locate images 202 in storage 204. The searches are performed responsive to inputs received from a plurality of users of client devices 110 via a network (block 502). The inputs include keywords 402 in this example that are matched to tags or other metadata associated with the images 202, such as to describe objects included in the images 202, a theme of the images, or other descriptive information.

The search monitoring module 206 detects these keywords 402 that are used to locate the images 202 (block 504) and the content suggestion module 214 generates suggestions based on the keywords 402 (block 506). The suggestions may be generated in a variety of ways. For example, the content suggestion module 214 may generate suggestions 212 based on the most popular keywords, based on which keywords have usage that is trending upward the fastest, identify unique keywords that were utilized previously below a threshold amount but now show usage above a threshold amount, and so on. In this way, a user is made aware of increases in popularity and/or what is popular now in order to guide a content creation process.

Exposure of the generated suggestions is controlled via a user interface by the one or more computing devices (block 508). The suggestions 212, for instance, may be output to a marketing and analytics service 108 to guide creation of content for a marketing campaign. The suggestions 212 may also be communicated to a content creation service 102 for output as part of a content creation process. The suggestions 212 may also be output to one of the client devices 110 that originated a search. In this way, the suggestions 212 based at least in part on the keywords 402 are usable to guide a creative professional in a variety of ways and thus also bridge a gap encountered by conventional techniques between creative professionals and consumers of content from the creative professionals.

Figure 6:
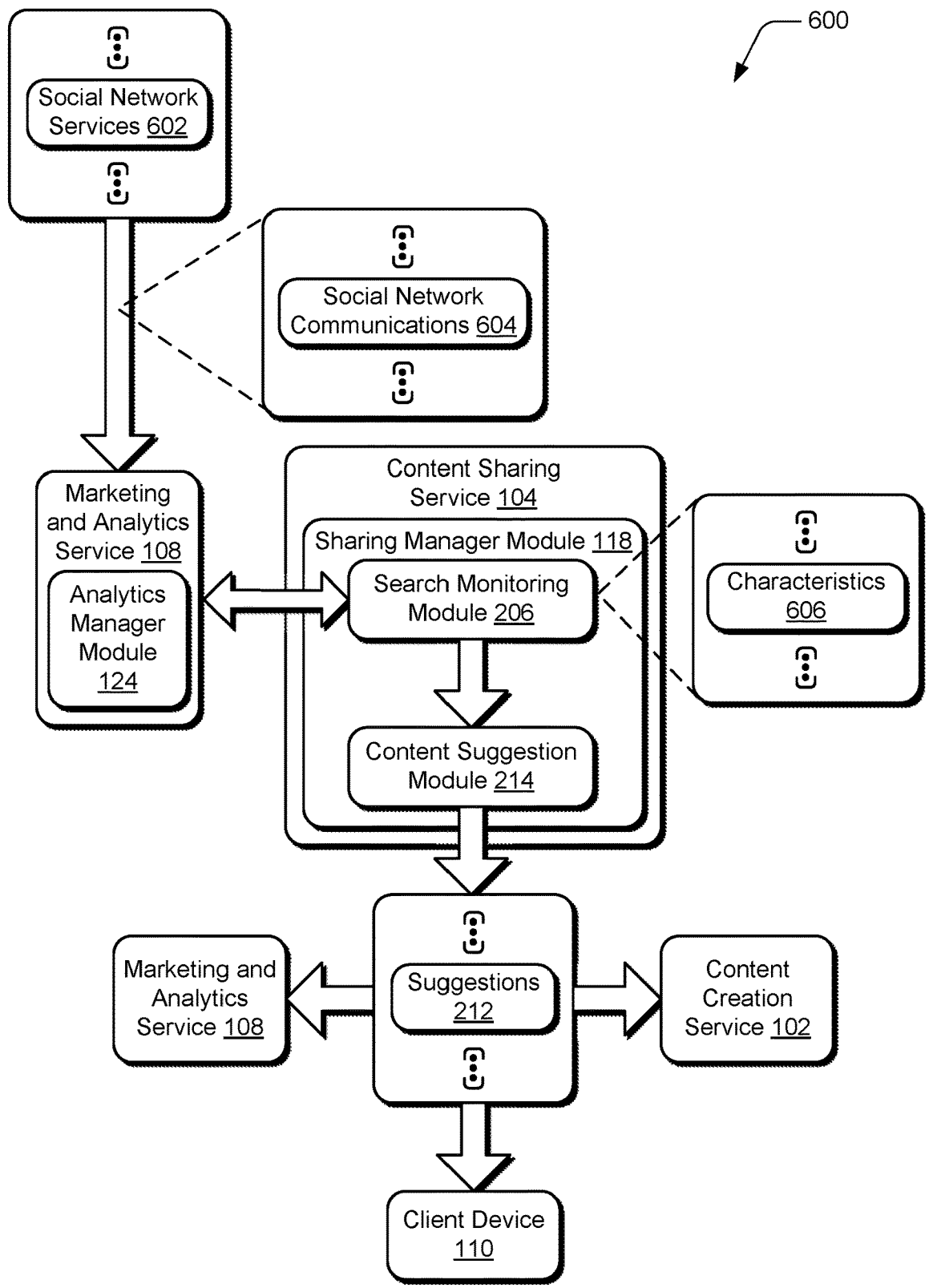
FIG. 6 depicts a system and FIG. 7 depicts a procedure in an example implementation in which suggestions are based on characteristics of images analyzed from data obtained from social network services.
Figure 7:
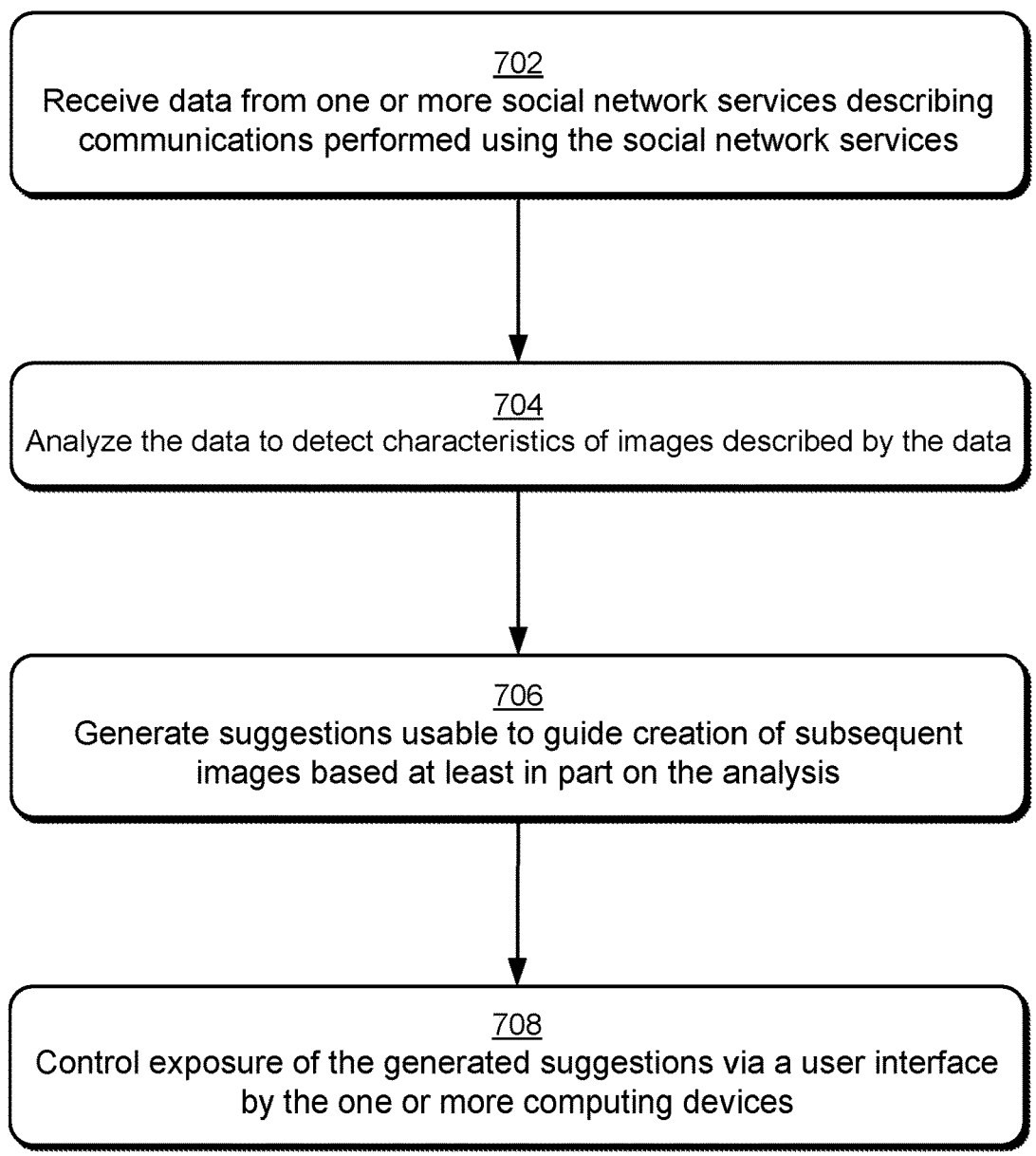

FIG. 6 depicts a system 600 and FIG. 7 depicts a procedure 700 in an example implementation in which suggestions are based on characteristics of images analyzed from data obtained from social network services. The content sharing service, for instance, may determine from data obtained from a marketing and analytics service which characteristics are commonly used for or involved with images and generate suggestions to guide content creation based on this analysis. In the following, reference is made interchangeably to both FIGS. 6 and 7.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

The marketing and analytics service 108 in this example is configured to monitor social network services 602 and more particularly social network communications 604 sent via the social network services 602. For example, users of the social networks 602 may post status updates (e.g., on Facebook®), images, short message (e.g., Tweets® on Twitter®), post images to an image sharing service (e.g., Instagram®), and so forth to be shared with friends, followers, and the public in general if so desired. Data describing these communications, such as text in the communication, metadata associated with images sent as part of the communications, and so on is captured by an analytics manager module 124 of the marketing and analytics service 108.

The search monitoring module 206 in this instance thus receives data from the one or more social network services describing communications performed using the social network services (block 702). The data is analyzed to detect characteristics 606 of images described by the data (block 704) and suggestions are generated that are usable to guide creation of subsequent images based at least in part on the analysis (block 706). Continuing with the previous example, the data may describe characteristics of images in a variety of ways. This may include textual descriptions generated manually by a user, such as "the techno look to that magazine cover looks great." A multitude of similar communications may thus service as a basis for the content suggestion module 214 to generate suggestions for a "techno look" to guide creation of subsequent images.

In another example, the social network communications 604 may include images themselves, such as images that are posted to be shared with other users of the social network services 602. The images may be analyzed for similarity and characteristics identified from this analysis may be used as a basis to generate suggestions 212, e.g., pictures of orange shoes are trending upward and thus the suggestions 212 indicate that creation of such an image may have a corresponding popularity.

Yet further, the images that are included as part of the social network communications 604 may have associated metadata that describes characteristics of the images, such as objects in the image, how the image is captured, processing performed on the image, an image device used to capture the image, and so on as described above. Thus, this metadata and the characteristics 606 obtained from the metadata is also usable by the content suggestion module 214 to generate suggestions to guide creation of subsequent images, such as which image filters to use, locations to "shoot at," objects to capture, and so forth.

As above, exposure of the generated suggestions is controlled via a user interface by the one or more computing devices (block 708). The suggestions 212, for instance, may be output to a marketing and analytics service 108 to guide creation of content for a marketing campaign, communicated to a content creation service 102 for output as part of a content creation process, output to the client device 110, and so forth. Thus, the suggestions 212 based on the social network communications 604 are usable to guide a creative professional in a variety of ways and thus also bridge a gap encountered by conventional techniques between creative professionals and consumers of content from the creative professionals.

Figure 8:
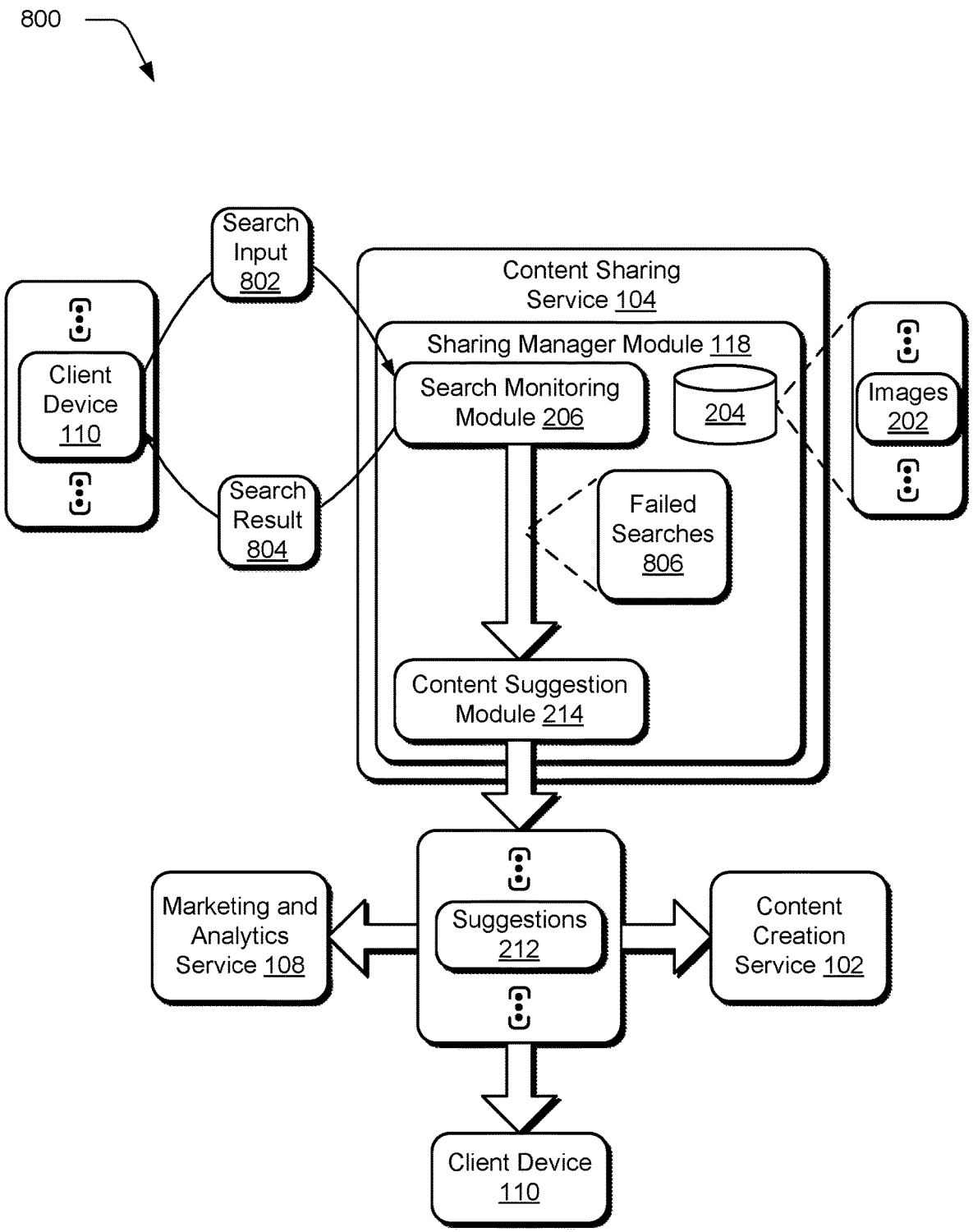
FIG. 8 depicts a system and FIGS. 9 and 10 depict procedures in an example implementation in which suggestions are based on recognition of failed searches.
Figure 9:
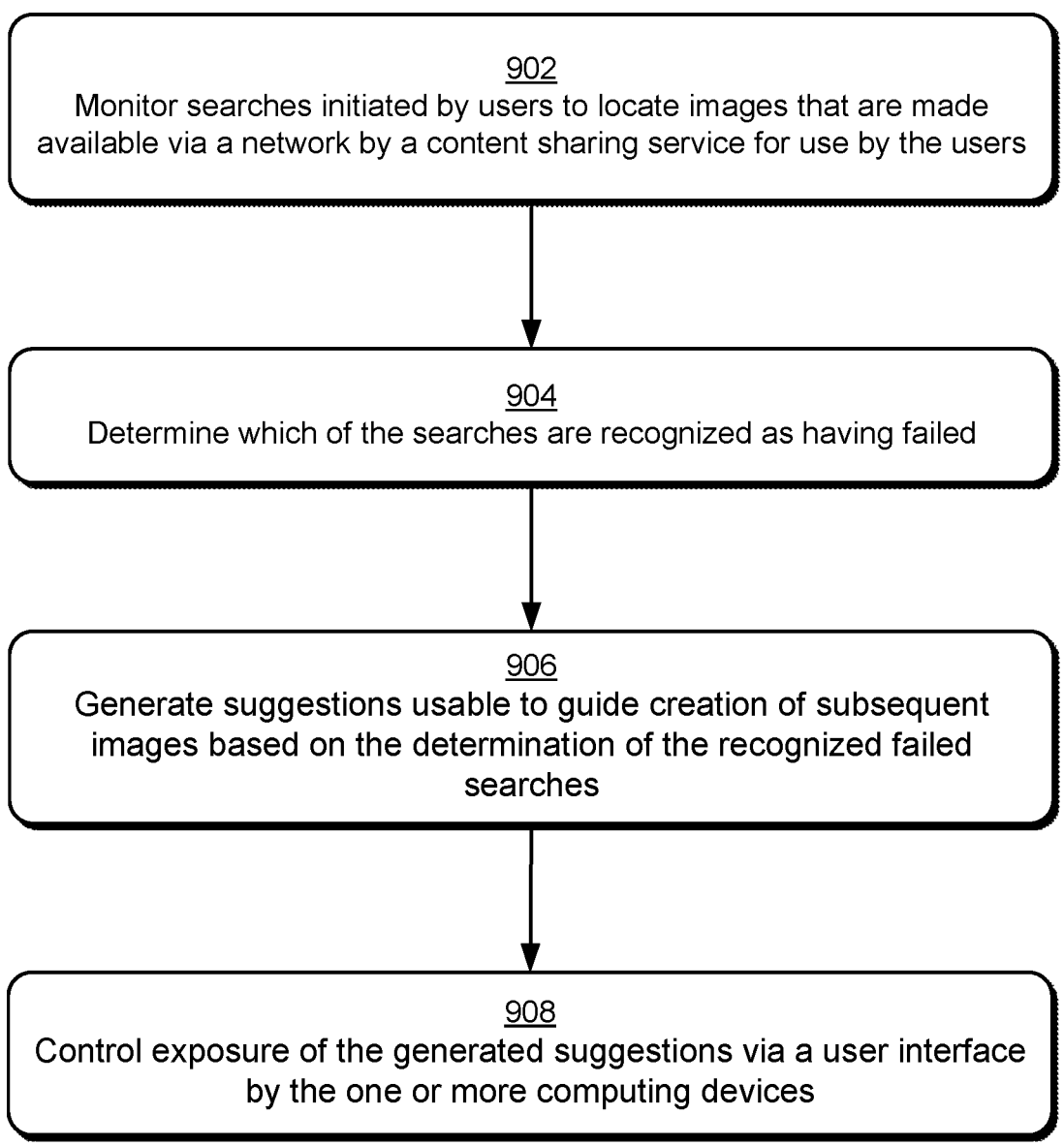
Figure 10:
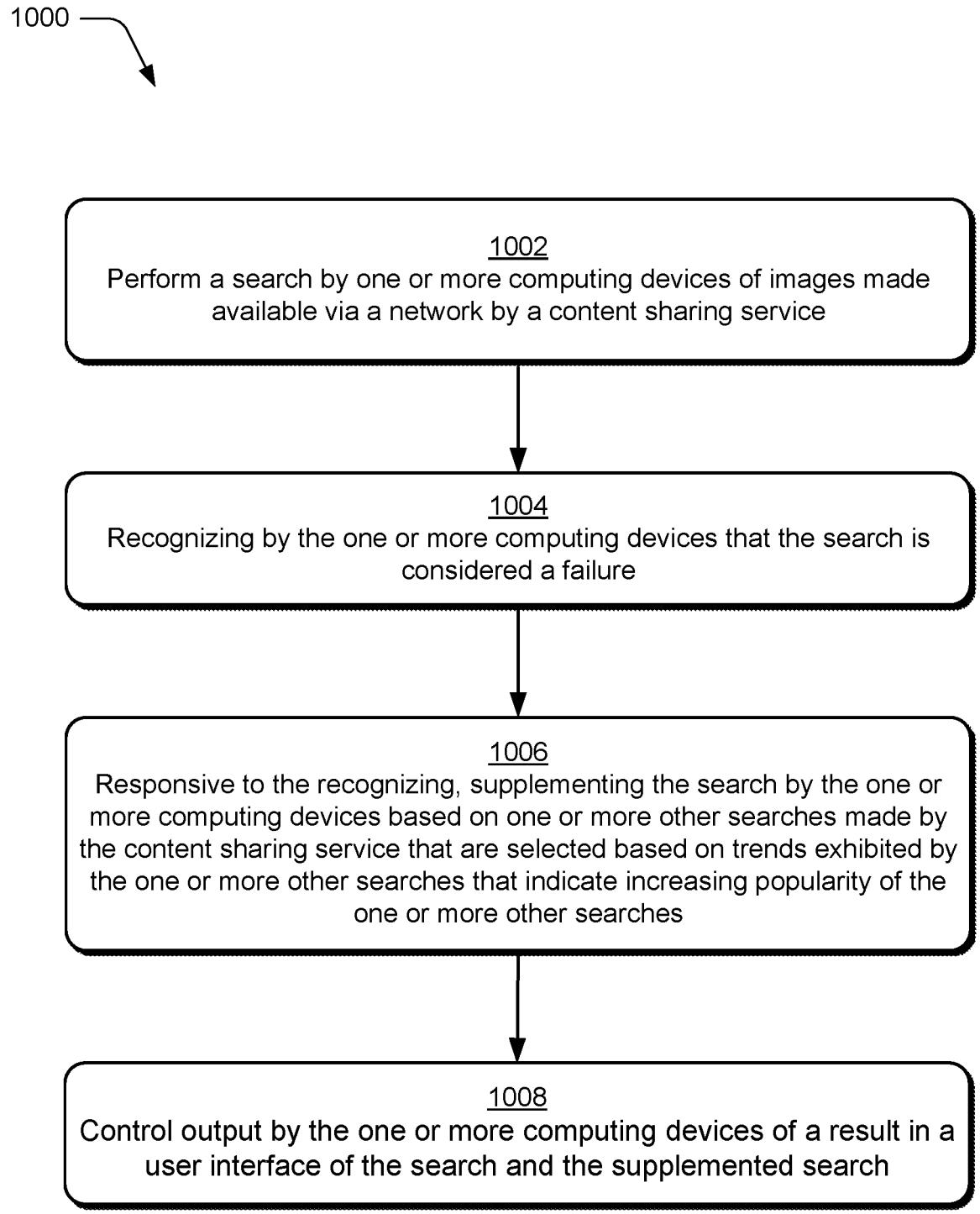

FIG. 8 depicts a system 800 and FIGS. 9 and 10 depict procedures 900, 1000 in an example implementation in which suggestions are based on recognition of failed searches. The content sharing service 104 in this instance leverages recognition that a search has failed for a desired image from the content sharing service 104 as a basis to generate suggestions to create subsequent images. In the following, reference is made interchangeably to FIGS. 8-10.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

As previously described, users of client devices 110 may perform searches through interaction with the sharing manger module 118 to locate images 202 of interest. The user, for instance, may generate a search input 802 having keywords that are matched to tags associated with the images 202, may use an image as an exemplar to locate similar images, and so forth. The sharing manager module 118 then provides a search result 804 to a user having images that correspond to the search input 802, if available.

In some instances, however, searches may be considered as having failed, which may be defined in a variety of ways. The search monitoring module 206, for instance, may monitor search initiated by users to locate images (block 902) such as search inputs 802 and search results 804 in order to determine which of the searches are recognized as having failed (block 904). The search result 804, for instance, may have less than a threshold number of items that correspond to the search input 802. An image search for "Martian farmer," for instance, may have few if any images 202. This lack of images may then be recognized by the search monitor module 206 as a failed search 806.

In another example, the search monitoring module 206 may recognize failure from a series of searches. A user, for instance, may provide a series of search inputs 802 and receive search results 804 in order to continually refine a search, which may be over the threshold amount described above. The series of searches, however, may not result in the user actually obtaining one or more of the images 202 in the results, and thus may be recognized as a failed search 806 because the search did not result in licensing of an image 202.

The content suggestion module 214 in this example generates suggestions 212 that are usable to guide creation of subsequent images based on the determination of the recognized failed searches (block 906). Continuing with the first example above, for instance, the suggestions 212 may describe searches that have been performed over a threshold amount of times but resulted in less than a threshold number of images 202. The suggestions 212 may also describe searches that did not result in purchase of a license to use images 202. As before, exposure of the generated suggestions via a user interface is controlled by the one or more computing devices (block 908), such as for exposure to the marketing and analytics service 108, content creation service 102, and/or client device 110. In this way, the suggestions 212 may guide content creation professionals to fill this unmet need through creation of content, which therefore bridges the gap between the needs of consumers and the desires of content professionals to monetize content creation.

The search monitoring module 206 may also support techniques to proactively supplement searches that are recognized as having a likelihood of resulting in a failure. The sharing manager module 118, for instance, may perform a search of images 202 made available via a network by the content sharing service 104 as described above (block 1002), e.g., via a keyword or exemplar. The search monitoring module 206 recognizes that the search is considered a failure (block 1004), such as by having less than a threshold number of results, is included in a series of similar searches performed by the user, and so on.

Responsive to this recognition, the search monitoring module 206 supplements the search based on one or more other searches made by the content sharing service 104 that are selected based on trends exhibited by the one or more other searches that indicate increasing popularity of the one or more other searches (block 1006). In this example, the search monitoring module 206 supports provision of additional search results by the sharing manager module 118 by leveraging a likelihood that popular searches may also be of interest to the user. This may be based, at least in part, on similarity of the search to other popular searches and even for unrelated popular searches.

Output of a result of the search and the supplemented search is controlled (block 1008) as previously described. In this way, the search monitoring module 206 may increase a likelihood of a user finding an item of content of interest, thereby increasing efficiency of user interaction with the content sharing service 104 by performing the search as requested along with a supplemented search based on search trends.

Figure 11:
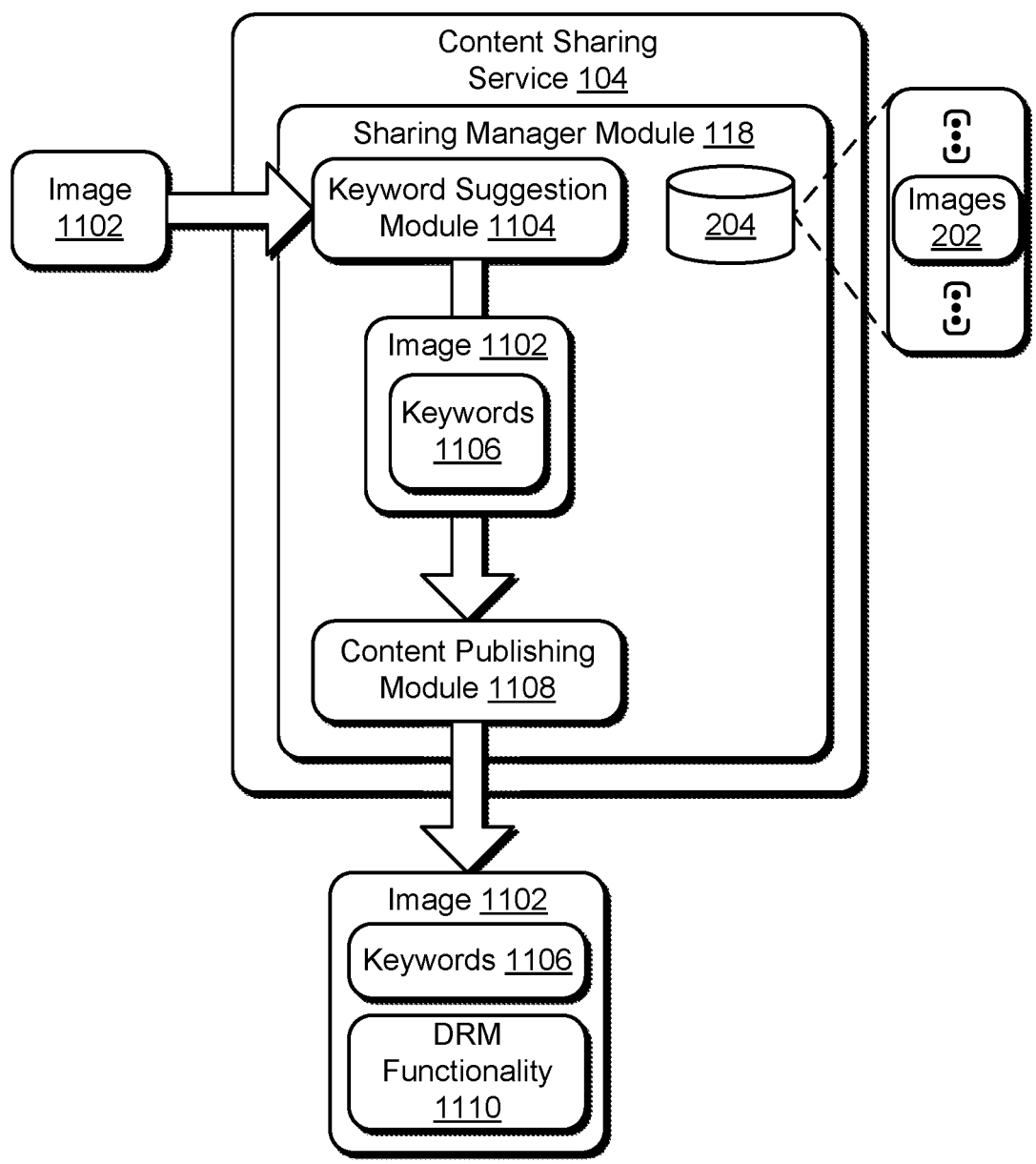
FIG. 11 depicts a system and FIG. 12 depicts a procedure in an example implementation in which functionality of a content sharing service is configured to assist users to tag and protect content.
Figure 12:
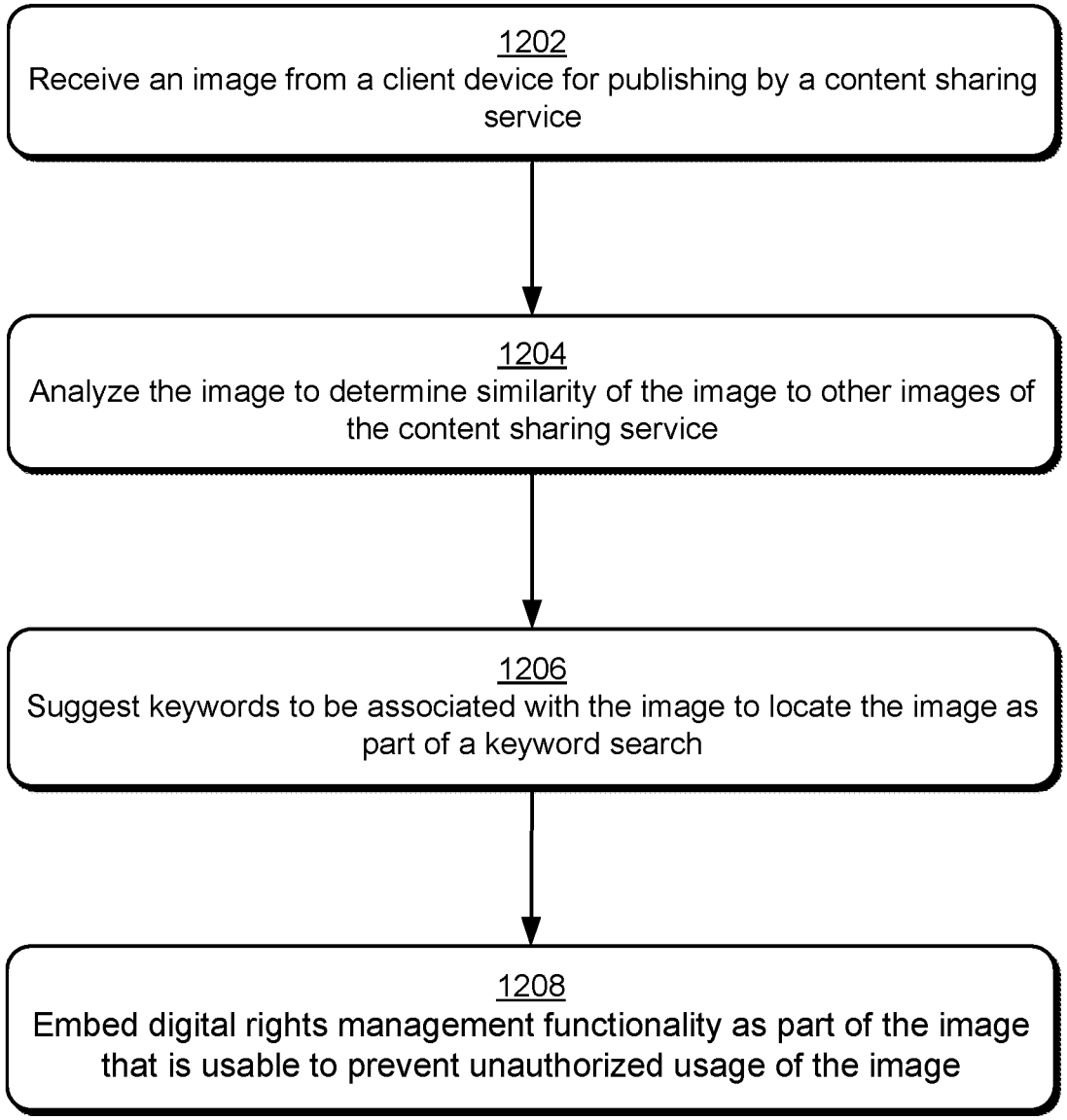

FIG. 11 depicts a system 1100 and FIG. 12 depicts a procedure 1200 in an example implementation in which functionality of the content sharing service 104 is configured to assist users to tag and protect content. In the following, reference is made interchangeably to FIGS. 11 and 12.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

The content sharing service 104 may support a variety of functionality to assist users in their success with generating revenue using the content sharing service 104. One such example include assistance in tagging of images 202. In conventional techniques, tags are applied to images as specified manually by users and as such may be wrong, improper, or not include relevant tags because the user is not aware of the existence of the tags. Therefore it may be difficult to locate the images 202 by other users.

In the illustrated example of FIG. 11, an image 1102 is received from a client device for publishing by a content sharing service (block 1202). The image is analyzed to determine similarity of the image to other images of the content sharing service (block 1204). A keyword suggestion module 1104, for instance, may employed to compare the image 1102 to other images 202 to determine similarity, one to another. Keywords 1106 are suggested, e.g., automatically and without user intervention, to be associated with the image to locate the image as part of a keyword search (block 1206). In this way, the keyword suggestion module 1104 may leverage tagging performed for other images 202, such as performed by professionals associated with the content sharing service 104 that is used to increase accuracy of the tagging. The keyword suggestion module 1104 is thus usable to propagate these tags to other similar images in an efficient and intuitive manner.

A variety of other functionality may also be supported by the content sharing service. An example of this is represented by a content publishing module 1108 that is configured to embed digital rights management functionality 1110 as part of the image 1102 that is usable to prevent unauthorized usage of the image (block 1208). The DRM functionality 1110, for instance, may include watermarking, access protection (e.g., passwords), and so on. This may be used to exposed the image 1102 for viewing (e.g., with a watermark or fingerprint) so that a user may determine "what it is" and then decide to purchase a license for use of the image 1102, which may be used to remove the watermark. A variety of other examples are also contemplated, such as DRM functionality 1110 that is configured to report how the image 1102 is used and by who (e.g., as a communication sent by the module) back to the content sharing service 104 such that usage of the image 1102 may be verified as authorized. If not, the DRM functionality 1110 may be controlled by the content sharing service 104 to prevent access by unauthorized parties.

Example System and Device

Figure 13:
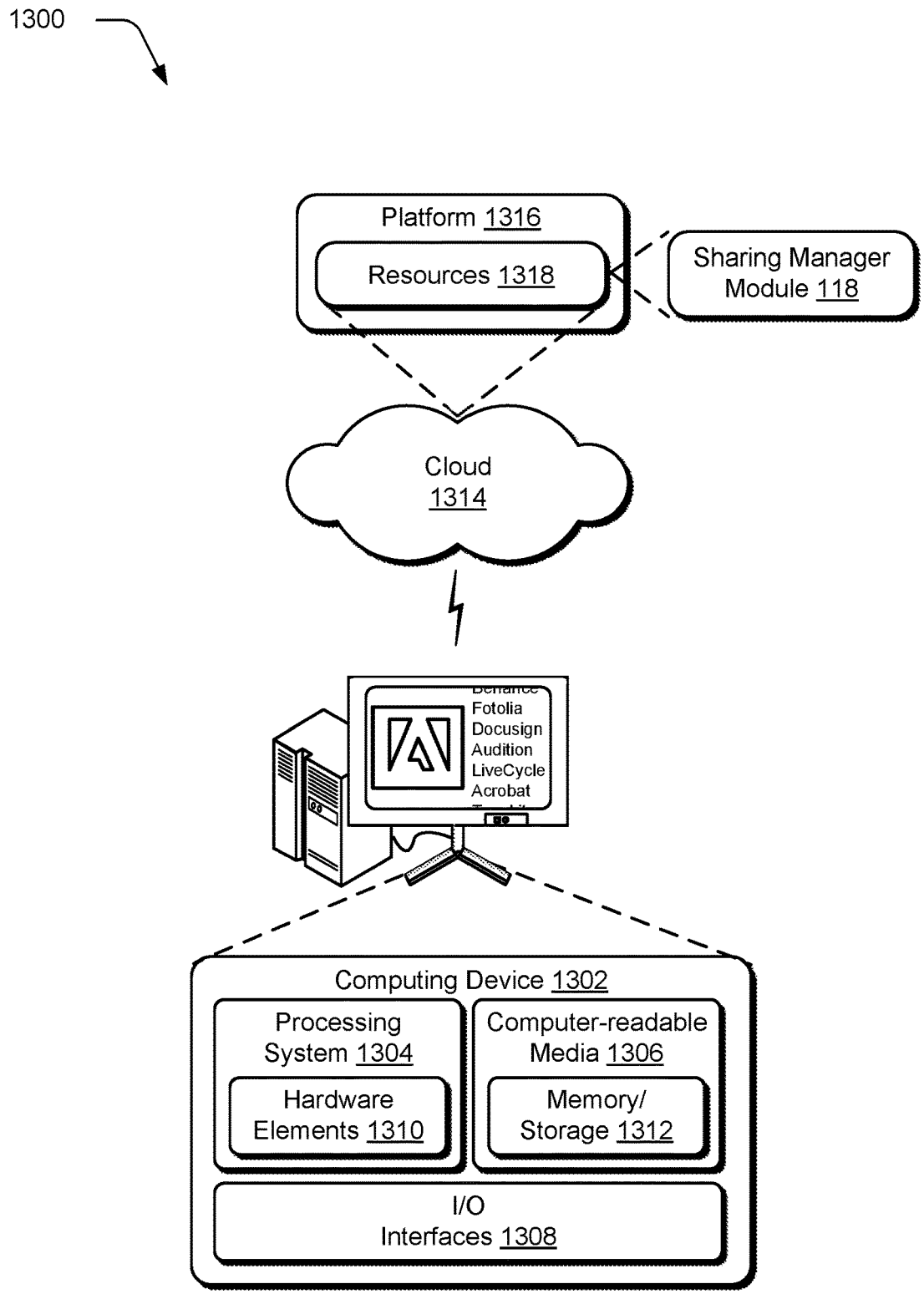
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the sharing manager module 118. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for controlling image searches, a method comprising:

performing an image search by one or more computing devices of images made available via a network by a content sharing service;

recognizing by the one or more computing devices that the image search is considered a failure based on the image search resulting in less than a threshold number of image results;

responsive to the recognizing, supplementing the image search by the one or more computing devices based on one or more other searches made by the content sharing service that are selected based on trends exhibited by the one or more other searches that indicate increasing popularity of the one or more other searches; and controlling output by the one or more computing devices of a result in a user interface of the image search and the supplemented search, the controlling including embedding digital rights management functionality in images included in the result of the image search and the supplemented search, the digital rights management functionality is configured to report how the images included in the result of the image search and the supplemented search are being used back to the content sharing service.

2. The method as described in claim 1, wherein the one or more other searches are selected as having similarity to the image search.

3. The method as described in claim 1, wherein the image search is a keyword search used to locate corresponding tags of the images included in the result of the image search and the supplemented search.

4. The method as described in claim 1, wherein the image search is included in a series of search inputs.

5. The method as described in claim 4, wherein the series of search inputs do not result in a user obtaining an image of the images made available via the network by the content sharing service.

6. The method as described in claim 1, wherein the content sharing service makes the images available via the network to users by licensing rights to use the images.

7. The method as described in claim 1, wherein the digital rights management functionality includes at least one of watermarks or access protections.

8. In a digital medium environment for controlling image searches, a method comprising:

performing an image search, by at least one computing device, of images made available via a network by a content sharing service;

recognizing, by the at least one computing device, the image search as a failure based on the image search resulting in less than a threshold number of image results;

responsive to the recognizing, supplementing, by the at least one computing device, the image search by performing the image search along with a supplemented search based on search trends; and controlling, by the at least one computing device, output of a result in a user interface of the image search and the supplemented search, the controlling including embedding digital rights management functionality in images included in the result of the image search and the supplemented search, the digital rights management functionality is configured to report how the images included in the result of the image search and the supplemented search are being used back to the content sharing service.

9. The method as described in claim 8, wherein the image search is included in a series of similar searches.

10. The method as described in claim 8, wherein the image search is a keyword search used to locate corresponding tags of the images included in the result of the image search and the supplemented search.

11. The method as described in claim 10, wherein the tags embed the digital rights management functionality and protect the images included in the result of the image search and the supplemented search from unauthorized use.

12. The method as described in claim 8, further comprising:

analyzing characteristics of the search trends; and exposing the characteristics as a content creation guide.

13. The method as described in claim 12, wherein the characteristics include common objects included in the images included in the result of the image search and the supplemented search.

14. The method as described in claim 8, further comprising exposing the image search as a suggestion to guide content creation.

15. The method as described in claim 8, wherein the digital rights management functionality includes at least one of watermarks or access protections.

16. A system comprising:

a processing system; and a computer-readable storage medium having instructions stored thereon that, responsive to execution by the processing system, causes the processing system to perform operations including:

performing an image search, via a network, of images made available via the network by a content sharing service;

recognizing the image search as a failure based on the image search resulting in less than a threshold number of image results;

performing a supplemented search based on one or more searches made by the content sharing service; and controlling output of a result of the image search and the supplemented search, the controlling including embedding digital rights management functionality in images included in the result of the image search and the supplemented search, the digital rights management functionality is configured to report how the images included in the result of the image search and the supplemented search are being used back to the content sharing service.

17. The system as described in claim 16, wherein the content sharing service makes the images available via the network to users by licensing rights to use the images.

18. The system as described in claim 16, wherein the one or more searches made by the content sharing service have similarity to the image search.

19. The system as described in claim 16, wherein the one or more searches made by the content sharing service exhibit trends that indicate increasing popularity of the one or more searches.

20. The system as described in claim 16, wherein the image search is a keyword search used to locate corresponding tags of the images included in the result of the image search and the supplemented search.

* * * * *